July 14, 1959

C. A. HARLESS 2,894,775

ROTARY SHAFT CLUTCH

Filed March 20, 1952

INVENTOR.
CHARLES A. HARLESS
BY
Sawyer & Kennedy
ATTORNEYS.

July 14, 1959
C. A. HARLESS
2,894,775
ROTARY SHAFT CLUTCH
Filed March 20, 1952
2 Sheets-Sheet 2
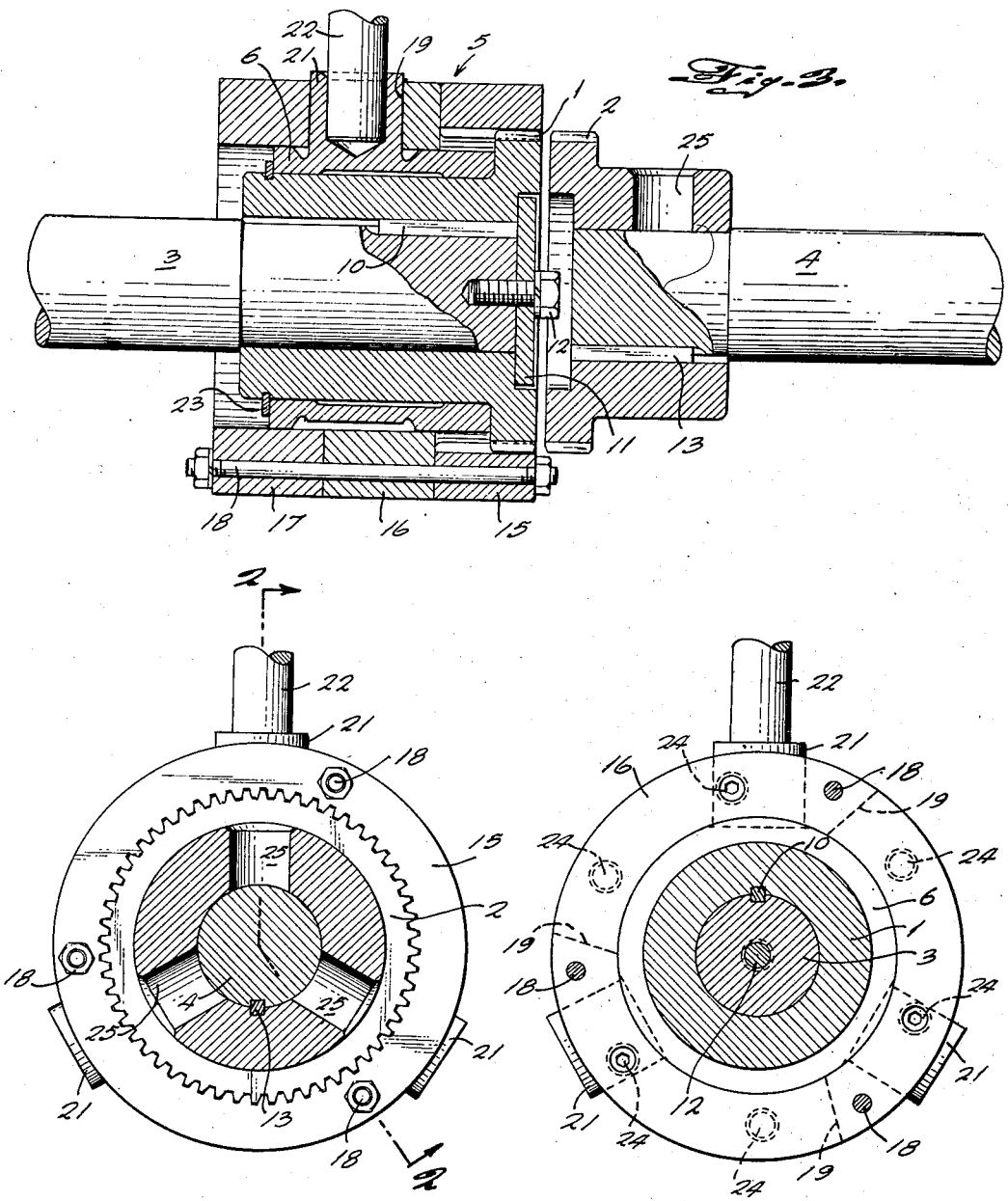
INVENTOR.
CHARLES A. HARLESS
BY
ATTORNEYS.

United States Patent Office 2,894,775
Patented July 14, 1959

2,894,775
ROTARY SHAFT CLUTCH

Charles A. Harless, Riverside, Conn., assignor to R. Hoe & Co., Inc., New York, N.Y., a corporation of New York Application March 20, 1952, Serial No. 277,641

6 Claims. (Cl. 287—108)

This invention relates to improvements in rotary shaft clutches.

More particularly, the invention is concerned with clutches of the type used in printing or other machines in which the drive for a number of units is taken off, or synchronized, by a line shaft. In such use, the coupling and uncoupling of shaft sections need not ordinarily be accomplished while the machine is running, it being sufficient to couple and uncouple while the machine is stopped for the purpose of altering the active unit arrangement to correspond to a change in the desired product. The clutch should, however, be simple, compact and positive, and it should be possible to operate it without complicated tools, or a combination of different tools.

Generally speaking, a clutch of the type in which two spur spline gears are coupled and uncoupled by means of an axially slidable internal ring spline gear has been found satisfactory for this class of service, and the invention is preferably, although not necessarily, used with coupling members of this type. In prior clutches, it has been usual to operate the axially slidable member by means of a clutch ring and groove, together with an operating handle and suitable mounting therefor. Such a mechanism is necessarily somewhat expensive and bulky. Alternatively, the slidable member may have a sliding movement for coupling and uncoupling, and a rotary movement for locking in the coupled and uncoupled positions. Such constructions require special tools or a plurality of tools for operating them, and generally are not adapted to use of standard gear parts, but require specially made spline gear parts.

It is an object of the present invention to provide an improved mechanism for operating the slidable member of a clutch of the type indicated.

A further object is to provide a clutch of the type indicated, in which standard gear and other parts may be used with little or no modification for a variety of installations.

A clutch embodying the invention in a preferred form will now be described with reference to the accompanying drawing, and the features forming the invention will then be pointed out in the appended claims.

Figures 1, 2:
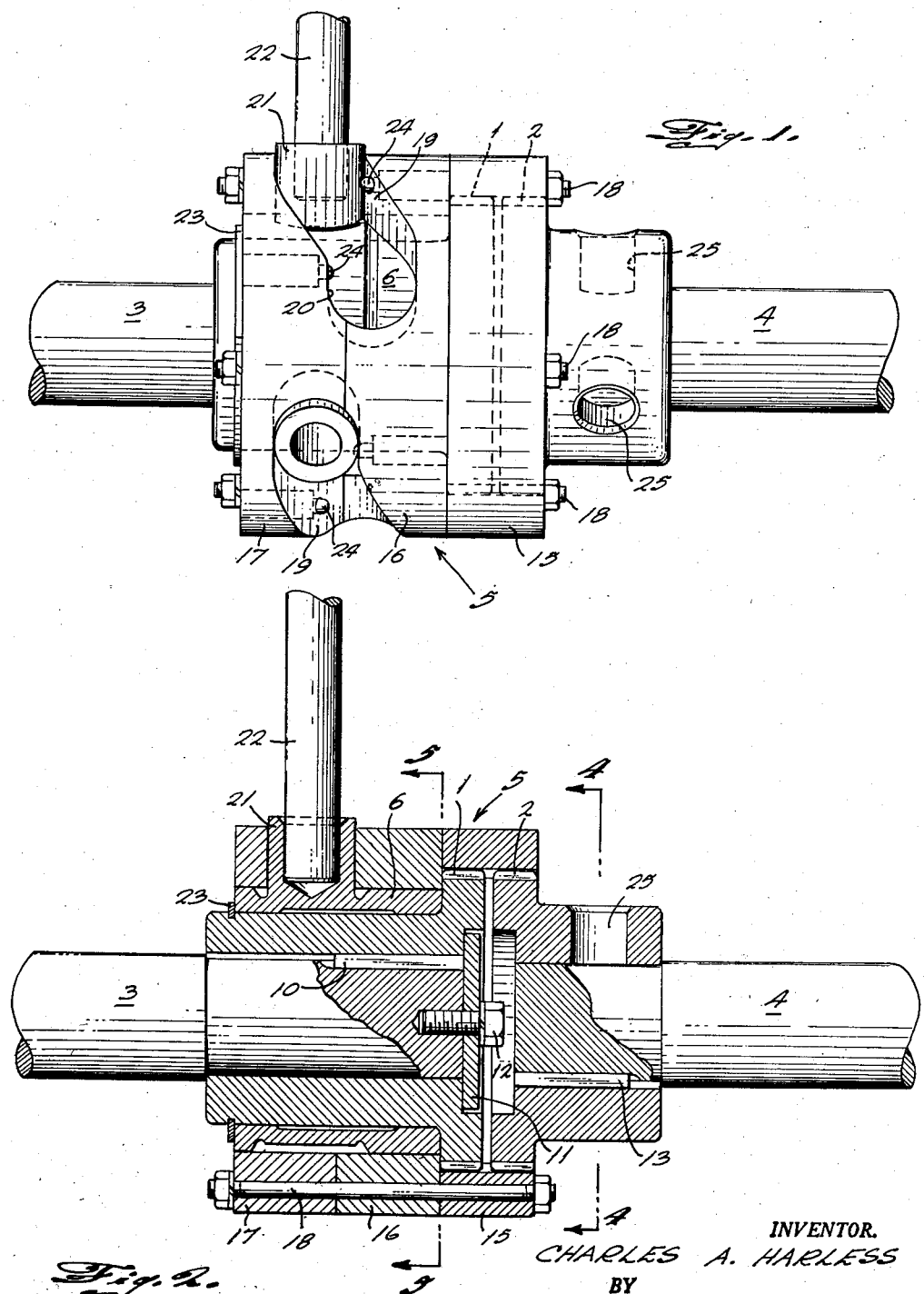
Figure 1 is a side elevation of a clutch embodying the invention of a preferred form.
Figure 2 is a central axial section on the line 2—2 of Figure 4.

Figure 3 is a section similar to Figure 2, but showing the clutch disengaged; and Figures 4 and 5 are, respectively, cross-sections on the lines 4—4 and 5—5 of Figure 2.

The clutch comprises spur spline gears 1 and 2 fixed to the ends 3 and 4 of a pair of shafts supported in alignment by any suitable bearing (not shown), an axially slidable element indicated generally at 5, which couples (Figures 1 and 2) and uncouples (Figure 3) the gears 1 and 2, and a rotatable operating element 6, which serves to move the element 5 axially for so engaging and disengaging the clutch.

Gear 1 is shown as fixed to a reduced end of shaft end 3 by a key 10, washer 11 and screw 12, and the gear 2 as being press fitted to the reduced end of shaft end 4 and fixed rotatively thereto by a key 13. The specific manner of attaching these elements is, however, shown only by way of illustration and forms no part of the present invention.

The slidable coupling member 5 comprises an internal ring spline gear 15 and a pair of sleeve rings 16 and 17, all held together by the rods 18 to form a slidable sleeve having internal teeth for meshing with the teeth of the spur gears 1 and 2. As will be understood, the teeth of the gears 1, 2 and 15 need not be cut to rotating or driving gear profiles, and the form and number of the cooperating splines may be varied as desired, as well as the type of positive engagement of the parts, without departing from the invention in its broader aspect. The construction of the invention does, however, make it possible to use standard gear parts, resulting in considerable convenience and economy.

The ring elements 16 and 17 are cut to form cam slots 19, generally helical in form but having dwells 20 at each end, and these slots receive and cooperate with projections 21, formed on the rotatable operating member 6, and having sockets for receiving a bar 22, which is used to turn the member 6. The latter is rotatably carried on the hub of gear 1 and held axially thereon by a snap ring 23 received in a groove, as shown. The outer surface of the member 6, in turn, supports the sleeve part 16—17 of the coupling member 5. Spring detents 24 serve to hold the member 5 in either the coupled position of Figures 1 and 2, or the uncoupled position of Figure 3, with the projection 21 of the operating member 6 in the dwell portions at the ends of the cam slots 19.

Ordinarily, the cam slots 19 will be provided to permit operation of the coupling in any rotary position of the shafting and the hub of the gear 2 is similarly provided with three sockets 25 to permit turning the shaft 4 to align gear 2 with gear 1 preliminary to coupling the shafts together, if necessary. The meeting ends of the teeth of the gears 2 and 15 may be chamfered or tapered so as to align these gears more or less automatically, in which event turning the gear 2 to produce alignment will be seldom, if ever, required.

The operation

Assuming the shaft to be stationary and the parts to be in the engaging position of Figures 1 and 2, and that it is desired to disengage the clutch, the bar 22 is inserted in a socket of an accessible projection 21 and pulled to turn the element 6 in the counter clockwise direction (Figures 4 and 5). While the spring detents 24 will prevent accidental movement of the member 6, they readily yield to permit this movement. The rotation of the member 6 slides the coupling member 5 back to the position of Figure 3, where the teeth of the internal ring spline gear 15 no longer engage the spur spline gear 2. The element 5 does not rotate during this movement because restrained therefrom by engagement with the teeth of the spur spline gear 1. The wrench is now withdrawn and the parts are held in disengaged position by the detents 24. The engagement of the clutch follows the same procedure, the parts moving in the reverse direction, except that it may be necessary to insert the bar in the socket 25 for rotating the shaft 4 slightly to align the same.

While the coupling may, of course, operate with either of the shaft ends shown as the driver and the other as the driven shaft section, if the shaft rotates in but one direction, the end 3 will preferably be the driven shaft. In this case, the cam slots may be located with the helices of the appropriate hand so that if the bar 22 should accidently be left in the socket of the member 21, the clutch will automatically disengage. Assuming clockwise rotation of the parts in Figure 5, it will merely be necessary that if the bar 22 is left in position in a socket of the projection 21, the engagement of the bar with any adjacent machine element as the shaft turns will operate to disengage the clutch, thus avoiding any possible damage due to leaving the bar in such socket.

What is claimed is:

1. In a rotary shaft positive clutch, and in combination, a spur spline gear having means for fixing it to a shaft end and a hub for carrying a rotary sleeve, a rotary sleeve carried on the hub, an axially slidable sleeve carried on the rotary sleeve, an internal ring spline gear carried on the axially slidable sleeve and movable thereby between an engaging position extending beyond the said spur spline gear for meshing with another spur spline gear and a disengaging position in which it is retracted toward the said spur spline gear, the internal ring spline gear meshing with the first mentioned spur spline gear in both the said engaging and disengaging positions, and cooperating cam means on the rotary and slidable sleeves forming a driving connection for sliding the slidable sleeves between engaging and disengaging positions upon rotative movement of the rotary sleeve between predetermined angular positions with reference to the said spur spline gear.

2. The combination according to claim 1, and comprising also spring detents for holding the rotary sleeve selectively in either of the said predetermined positions.

3. In a rotary shaft positive clutch, and in combination, a spur spline gear having means for fixing it to a shaft end and a hub for carrying a rotary sleeve, a rotary sleeve carried on the hub and having a plurality of radial projections, an axially slidable sleeve carried on the rotary sleeve and having a plurality of generally helical cam slots accommodating the projections and cooperating therewith to form a driving connection between the rotary and axially slidable sleeves, an internal ring spline gear carried on the axially slidable sleeve and movable thereby between an engaging position extending beyond the said spur spline gear for meshing with another spur spline gear and a disengaging position in which it is retracted toward the said spur spline gear, the internal ring spline gear meshing with the first mentioned spur spline gear in both the said engaging and disengaging positions, whereby the slidable sleeve is moved between engaging and disengaging positions upon rotative movement of the rotary sleeve between predetermined angular positions with reference to the said spur spline gear.

4. The combination according to claim 3, in which the cam slots have dwells at their ends and the slidable sleeve has spring detents for holding the projections selectively on the dwells at either end of the cam slots.

5. In a rotary shaft positive clutch, and in combination, a rotary sleeve having a plurality of radial projections, means for rotatively mounting the rotary sleeve on a shaft end, an axially slidable sleeve carried on the rotary sleeve and having a plurality of generally helical cam slots accommodating the projections and cooperating therewith to form a driving connection between the rotary and axially slidable sleeves, a positive clutch coupling member carried on the axially slidable sleeve and movable thereby between a clutch engaging position and a clutch disengaging position, and means rotatively fixing the said slidable sleeve to the shaft end, whereby the slidable sleeve is moved between engaging and disengaging positions upon rotative movement of the rotary sleeve between predetermined angular positions with reference to the means for mounting it on a shaft end.

6. The combination according to claim 5, in which the cam slots have dwells at their ends and the slidable sleeve has spring detents for holding the projections selectively on the dwells at either end of the cam slots.

References Cited in the file of this patent

UNITED STATES PATENTS

| | | |
|---|---|---|
| 431,066 | Leverich | July 1, 1890 |
| 882,643 | Lundgren | Mar. 24, 1908 |
| 2,070,140 | Peterson et al. | Feb. 9, 1937 |
| 2,105,218 | Kirby | Jan. 11, 1938 |
| 2,457,210 | Coffey | Dec. 28, 1948 |
| 2,535,388 | Burks et al. | Dec. 26, 1950 |
| 2,549,245 | Schultz | Apr. 17, 1951 |

FOREIGN PATENTS

| | | |
|---|---|---|
| 14,198 | Great Britain | 1892 |